United States Patent [19]

Sato

[11] Patent Number: 4,934,762
[45] Date of Patent: Jun. 19, 1990

[54] HYDRAULIC BRAKE SYSTEM

[75] Inventor: Makoto Sato, Wako, Japan

[73] Assignee: Honda Giken Kogyo Kabushiki Kaisha, Tokyo, Japan

[21] Appl. No.: 322,852

[22] Filed: Mar. 14, 1989

[30] Foreign Application Priority Data

Mar. 14, 1988 [JP] Japan .................................. 63-59991

[51] Int. Cl.⁵ .......................... B60T 8/32; B60T 8/48
[52] U.S. Cl. .................................... 303/117; 303/115; 303/119; 303/110
[58] Field of Search ............... 303/115, 116, 117, 119, 303/110, 113, 13–18, 100; 60/545, 591; 188/181; 180/197, 233, 244

[56] References Cited

U.S. PATENT DOCUMENTS

| | | | |
|---|---|---|---|
| 3,286,734 | 11/1966 | Hartshorne | 303/117 X |
| 3,443,594 | 5/1969 | Frayer | 303/117 X |
| 3,486,801 | 12/1969 | Frayer | 303/117 |
| 3,514,161 | 5/1970 | Frayer | 303/117 |
| 3,671,082 | 6/1972 | Stevens | 303/117 X |
| 3,671,085 | 6/1972 | Pasek et al. | 303/117 |
| 3,820,856 | 6/1974 | Adahan | 303/117 |
| 3,880,476 | 4/1975 | Belart et al. | 303/119 |
| 4,155,604 | 5/1979 | Fenart | 303/119 |
| 4,685,748 | 8/1987 | Zoerb | 303/115 |
| 4,690,464 | 9/1987 | Matsuda et al. | 303/115 |
| 4,717,211 | 1/1988 | Dittner | 303/119 |

FOREIGN PATENT DOCUMENTS 0173363 7/1987 Japan .................................. 303/117

Primary Examiner—Douglas C. Butler
Attorney, Agent, or Firm—Armstrong, Nikaido, Marmelstein, Kubovcik & Kubovcik

[57] ABSTRACT

A hydraulic brake system in which oil pressure control valves are respectively interposed between a master cylinder as well as an oil pressure source for generating a fixed oil pressure, and corresponding brakes. Each of the oil pressure control valves includes a valve casing having a first input port communicating with the master cylinder, a second input port communicating with the oil pressure source, an output port communicating with the corresponding brake, and an oil pressure chamber communicating with the output port. A spool is slidable fitted in a bore in the valve casing with a pressure receiving face at one end thereof confronted to the oil pressure chamber, for bringing the second input port and the oil pressure chamber into communcation on a side contracting the oil pressure chamber and for bringing the first input port and the oil pressure chamber into communication on a side expanding the oil pressure chamber. An electrical-driving device is interlockingly coupled to the other end of the spool so as to afford a thrust corresponding to an energizing power level toward the side contracting the oil pressure chamber. Thus, the oil pressures of the brakes can be controlled at quick response by controlling the energizing power level of the electrical-driving device.

12 Claims, 3 Drawing Sheets

HYDRAULIC BRAKE SYSTEM

BACKGROUND OF THE INVENTION:

The present invention relates to a hydraulic brake system having a master cylinder, and brakes which are connected to the master cylinder so as to receive the output oil pressures from the master cylinder and provide braking forces to the wheels of a vehicle.

In prior-art hydraulic brake system of the type specified above, as disclosed in the official gazette of Japanese Utility Model Registration Application Laid-Open No. 77068/1987 by way of example, the oil pressures delivered from the master cylinder in accordance with the magnitude of tread of a brake pedal are controlled by hydraulic control units and then supplied to the brakes. Meanwhile, when a car is to start on the surface of a road exhibiting a low coefficient of friction, for example, a snowcovered road or a frozen road, it is sometimes the case that the driving wheels of the car slip for a very short time, to grind the road surface and to lower the coefficient of friction further. If, on such an occasion, brake pressures can be controlled at quick response, the starting performance of the car can be enhanced. With the prior-art system, however, such a control of the brake pressures is impossible.

SUMMARY OF THE INVENTION:

The present invention has been made in view of the circumstances as stated above, and has for its object to provide a hydraulic brake system in which oil pressure control valves are respectively interposed between a master cylinder as well as an oil pressure source for generating a fixed oil pressure, and corresponding brakes; each oil pressure control valve including a valve casing which has a first input port communicating with said master cylinder, a second input port communicating with the oil pressure source, an output port communicating with the corresponding brake, and an oil pressure chamber communicating with the output port, a spool means slidably fitted in the valve casing with a pressure receiving face at one end thereof confronted to said oil pressure chamber, for bringing the second input port and the oil pressure chamber into communication on a side contracting the oil pressure chamber and for bringing the first input port and the oil pressure chamber into communication on a side expanding the oil pressure chamber, and electrical-driving means interlockingly coupled to the other end of the spool means for providing a thrust corresponding to an energizing power level toward the side contracting the oil pressure chamber. With the construction described above, while the electric power of the electrical-driving means is cut off, the spool lies on the side expanding the oil pressure chamber, so that the first input port and the output port are held in communication, and the brake is supplied with an oil pressure from the master cylinder. On the other hand, when the electric power is provided to the electrical-driving means, the spool is driven to the side contracting the oil pressure chamber and brings the second input port and the oil pressure chamber into communication, and the oil pressure of the pressure chamber, namely, that of the brake becomes a value which is substantially proportional to the thrust of the electrical-driving means, in other words, the energizing power level, so that the oil pressure of the brake can be controlled at quick response by controlling the energizing power level of the electrical-driving means.

The above and other objects, features and advantages of the present invention will become apparent from the following detailed description of a preferred embodiment taken with reference to the accompanying drawings.

BRIEF DESCRIPTION OF THE DRAWINGS:

The drawings illustrate one embodiment of a hydraulic brake system according to the present invention, wherein.

Figure 1:
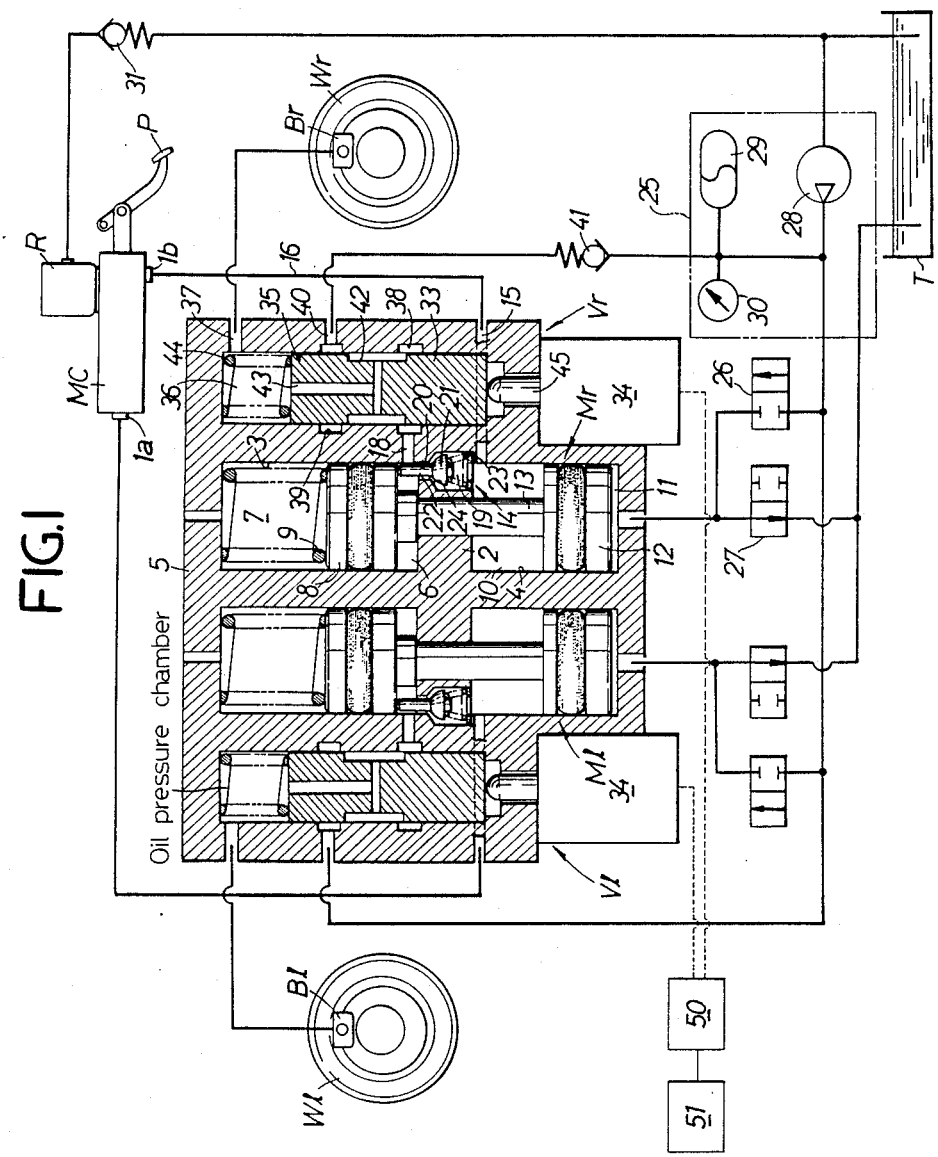
FIG. 1 is a sectional view of the system which includes hydraulic channels.

DESCRIPTION OF THE PREFERRED EMBODIMENT:

Now, an embodiment of the present invention will be described with reference to the drawings. Referring first to FIG. 1, a tandem type master cylinder MC having a reservoir R is provided with two output ports $1a$ and $1b$. Brakes $B_l$ and $B_r$ which are respectively installed on a left driving wheel $W_l$ and a right driving wheel $W_r$, are respectively fed with oil pressures delivered from both the output ports $1a$ and $1b$ in correspondence with the magnitude of tread of a brake pedal P, through antilock controlling modulators $M_l$ and $M_r$ and oil pressure control valves $V_l$ and $V_r$.

The modulators $M_l$ and $M_r$ have basically the same constructions, and also the oil pressure control valves $V_l$ and $V_r$ have basically the same constructions. Therefore, only portions concerning the modulator $M_r$ and the oil pressure control valve $V_r$ on the right side will be described in detail below, and portions concerning the modulator $M_l$ and the oil pressure control valve $V_l$ on the left side shall be omitted from the following description.

The modulator $M_r$ comprises a casing 5 which is formed with first and second cylinder bores 3 and 4 coaxially arranged with a partition wall 2 interposed therebetween. A first piston 8 is slidably fitted in the first cylinder bore 3 so as to define an output oil pressure chamber 6 between this first piston and the partition wall 2 and to define a spring chamber 7 open to the atmosphere on a side opposite the output oil pressure chamber 6. A spring 9 is accommodated in the spring chamber 7 in order to resiliently urge the first piston 8 toward the partition wall 2. A second piston 12 is slidably fitted in the second cylinder bore 4 so as to define an input oil pressure chamber 10 between this second piston and the partition wall 2 and to define a control oil pressure chamber 11 on a side opposite the input oil pressure chamber 10. A piston rod 13 couples both pistons 8 and 12 coaxially while penetrating the partition wall 2 air-tightly and movably. A valve mechanism 14 is provided in the partition wall 2 in order to hold and cut off the communication between the input oil pressure chamber 10 and the output oil pressure chamber 6.

The casing 5 is formed with a first input port 15 which leads to one output port $1b$ of the master cylinder MC through a pipe 16, and which communicates with the input oil pressure chamber 10. In addition, the casing 5 is formed with an oil passage 18 which can communicate with the brake $B_r$ through the oil pressure control valve $V_r$ and which communicates with the output oil pressure chamber 6.

The valve mechanism 14 comprises a valve chamber 19 which is provided in the partition wall 2 in communication with the input oil pressure chamber 10. A valve hole 20 extends between the valve chamber 19 and the output oil pressure chamber 6. A semispherical valve body 21 is accommodated in the valve chamber 19 so as to open and close the valve hole 20. A drive rod 22 is integral with the valve body 21 and is inserted through the valve hole 20 so as to cause its fore end to abut against the first piston 8. A spring 23 is accommodated in the valve chamber 19 so as to urge the valve body 21 in a valve closing direction. The end face of the valve chamber 19 near the valve hole 20 is formed with a tapered valve seat 24 whose diameter decreases toward the valve hole 20. When the first piston 8 has undergone the maximum limit displacement toward the partition wall 2, the drive rod 22 is depressed by the first piston 8 to separate the valve body 21 away from the valve seat 24. Under this state, the valve mechanism 14 opens the valve hole 20 to hold the input oil pressure chamber 10 and the output oil pressure chamber 6 in communication. On the other hand, when the first piston 8 has come away from the partition wall 2, the spring 23 causes the drive rod 22 to move until the valve body 21 sits on the valve seat 24. Under the state under which the valve body 21 sits on the valve seat 24 owing to the urging force of the spring 23, the valve mechanism 14 cuts off the communication between the input oil pressure chamber 10 and the output oil pressure chamber 6.

In order to control such movements of the first piston 8, the control oil pressure chamber 11 which confronts the end face of the second piston 12 joined to the first piston 8, the end face being remote from the input oil pressure chamber 10, is connected to an oil pressure source 25 through a normally-closed first changeover valve 26. The control oil pressure chamber 11 is also connected to an oil tank T through a normally-open second changeover valve 27. The oil pressure source 25 supplies a fixed oil pressure at all times. The source 25 comprises a hydraulic pump 28 for drawing up a working oil from the oil tank T, an accumulator 29, and an oil pressure sensor 30 for sensing trouble and oil pressure fall of the hydraulic pump 28 and controlling the drive start and stop of the hydraulic pump 28. Further, the oil tank T is connected to the reservoir R of the master cylinder MC through a nonreturn valve 31.

In an ordinary running condition, the first changeover valve 26 is closed while the second changeover valve 27 is open, and any pressure in the control oil pressure chamber 11 is released to the oil tank T that the second piston 12 moves to the side of contracting the control oil pressure chamber 11. Under such a state, the first piston 8 comes nearer to the partition wall 2, and the valve mechanism 14 opens the valve hole 20 to bring the input oil pressure chamber 10 and the output oil pressure chamber 6 into communication. Therefore, the oil pressure delivered from the master cylinder MC can be fed from the output oil pressure chamber 6 to the brake $B_r$ through the oil passage 18 as well as through the oil pressure control valve $V_r$. Meanwhile, when the driving wheel $W_r$ has become liable to lock, the first changeover valve 26 is opened, and the second changeover valve 27 is closed. Thus, the oil pressure from the oil pressure source 25 is fed to the control oil pressure chamber 11 to move the second piston 12 toward the partition wall 2 and to accordingly bring the first piston 8 away from the partition wall 2, so that the valve mechanism 14 closes the valve hole 20. Moreover, since the volume of the output oil pressure chamber 6 increases, the oil pressure which can be fed to the brake $B_r$ through the oil pressure control valve $V_r$ is decreased, and hence, locking of the driving wheel $W_r$ is avoided.

The oil pressure control valve $V_r$ comprises a spool 33 which is slidably fitted in the casing 5. A linear solenoid 34 as electrical-driving means is attached to the casing 5 so as to drive the spool 33. The casing 5 is formed with a slide bore 35 which is parallel to the first and second cylinder bores 3 and 4 in the modulator $M_r$. Both ends are blocked. The spool 33 is slidably fitted in the slide bore 35. An oil pressure chamber 36 is defined between one end of the slide bore 35 and one end face of the spool 33. The oil pressure chamber 36 communicates with the brake $B_r$ through an output port 37 which is provided in the casing 5. A first annular groove 38 is formed in the part of the inner surface of the slide bore 35 close to the other end thereof. A second annular groove 39 is formed in the part of the inner surface of the slide bore 35 intermediate between the first annular groove 38 and the oil pressure chamber 36. The first annular groove 38 communicates with the oil passage 18, while the second annular groove 39 communicates with a second input port 40 which is provided in the casing 5. The second input port 40 is connected to the oil pressure source 25 through a nonreturn valve 41.

The spool 33 is provided with an annular recess 42 in the middle part of the outer surface thereof and with a communicating passage 43 which has one end opened to the annular recess 42 and the other end held in communication with the oil pressure chamber 36. The axial length of the annular recess 42 is so set that, when the spool 33 has moved in the direction of expanding the oil pressure chamber 36, namely, downwards as viewed in FIG. 1, it holds the first annular groove 38 and the annular recess 42 in communication and cuts off the communication between the second annular groove 39 and the annular recess 42. Further, when the spool 33 has moved in the direction of contracting the oil pressure chamber 36, namely, upwards as viewed in FIG. 1, it holds the second annular groove 39 and the annular recess 42 in communication and cuts off the communication between the first annular groove 38 and the annular recess 42.

A spring 44 is provided in the oil pressure chamber 36 which functions to urge the spool 33 in the direction of bringing the first annular groove 38 and the annular recess 42 into communication, namely, downwards as viewed in FIG. 1. The linear solenoid 34 having a push rod 45 is attached to the casing 5 on the other end side of the slide bore 35. The push rod 45 is coaxially held in abutment against the other end of the spool 33 while penetrating the casing 5.

Figure 2:
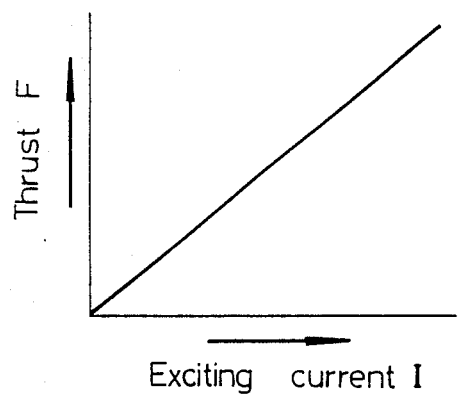
FIG. 2 is a graph showing the relationship between the exciting current and the thrust of a linear solenoid.
Figure 3:
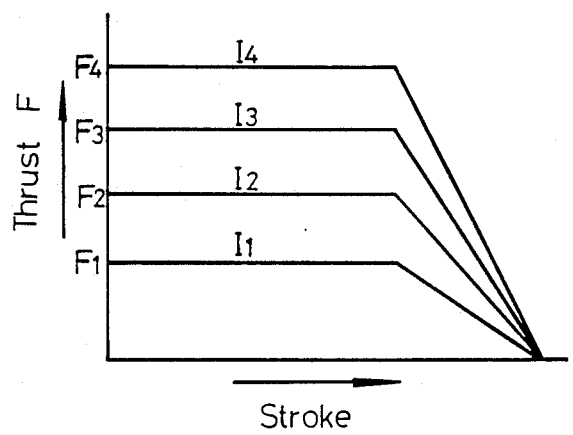
FIG. 3 is a graph showing the relationships between the stroke and the thrust of the linear solenoid.

Here, as illustrated in FIG. 2, the linear solenoid 34 generates a thrust F which is proportional to an energizing power level, namely, an exciting current I or to a voltage in the case of assuming a fixed resistance. As illustrated in FIG. 3, the linear solenoid 34 generates thrusts $F_1$-$F_4$ in correspondence with exciting currents $I_1$-$F_4$ within a certain stroke range.

The linear solenoids 34, 34 are supplied with an exciting current from an electric source 51 which is controlled by a control circuit 50. The control circuit 50 is arranged, for example, such that the linear solenoids 34, 34 are excited when a slip state is detected at the driving wheels $W_l$ and $W_r$.

Next, the operation of this embodiment will be described. In the ordinary running condition of a car, the first changeover valve 26 is closed, and the second changeover valve 27 is open, so that the oil pressure from the oil pressure source is not fed to the control oil pressure chamber 11 of the modulator $M_r$. Under such a state, the valve mechanism 14 opens the valve hole 20 and the oil pressure from the master cylinder MC is fed from the input oil pressure chamber 10 to the output oil pressure chamber 6 through the valve mechanism 14. Thus, when the linear solenoid 34 in the oil pressure control valve $V_r$ is not being excited, the spool 33 moves the annular recess 42 down to the position of communicating with the first annular groove 38 as viewed in FIG. 1. Accordingly, the oil pressure of the output oil pressure chamber 6 is fed to the brake $B_r$ through the oil passage 18, the first annular groove 38, the annular recess 42, the communicating passage 43 and the oil pressure chamber 36, and the braking force which corresponds to the magnitude of tread of the brake pedal P is afforded by the brake $B_r$.

When the linear solenoid 34 is excited under such a state, the spool 33 is urged upwards by the push rod 45, and it cuts off the first annular groove 38 from the annular recess 42 and moves this annular recess to the position of communicating with the second annular groove 39. Thus, the oil pressure of the oil pressure source 25 is fed from the second input port 40 to the brake $B_r$ through the annular recess 42, the communicating passage 43 and the oil pressure chamber 36. Moreover, the spool 33 is urged by the thrust F of the linear solenoid 34. Therefore, the oil pressure of the oil pressure chamber 36, namely, the oil pressure acting on the brake $B_r$ as expressed by $P_B$ is given by the following equation when letter S denotes the pressure receiving area of the spool 33 confronting the oil pressure chamber 36 and the urging force of the spring 44 whose set load has a small value is neglected:

$$P_B = F/S$$

Figure 4:
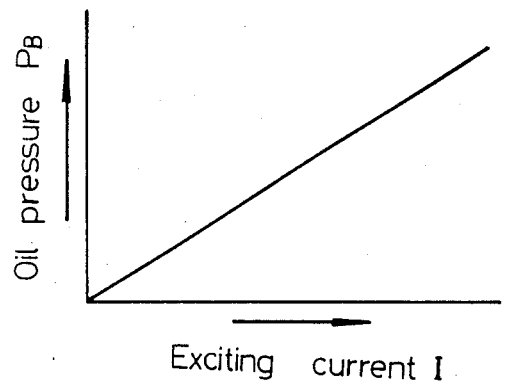
FIG. 4 is a graph showing the relationship between the exciting current of the linear solenoid and the oil pressure of a brake.

That is, the oil pressure $P_B$ becomes proportional to the thrust F. Since the thrust F of the linear solenoid 34 is, in turn, proportional to the exciting current I, the oil pressure $P_B$ becomes proportional to the exciting current I as illustrated in FIG. 4. Accordingly, the control of the exciting current I of the linear solenoid 34 makes it possible to control the oil pressure $P_B$ which is to be supplied to the brake $B_r$.

The oil pressure control of the brake $B_r$ as described above is performed during, for example, slipping of the driving wheel immediately after the start of the car, and the starting performance of the car can be enhanced at quick response by electrically controlling the brake pressure.

By the way, when the exciting current of the linear solenoid 34 is given in the form of pulses at a sufficiently high frequency and the pulse widths thereof are controlled, the power consumption of this linear solenoid can be lowered.

It is readily apparent that the above-described has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A hydraulic brake system having a master cylinder, a driving wheel and a brake connected to the master cylinder so as to receive an output oil pressure of the master cylinder and afford a driving wheel braking force comprising an oil pressure control valve interposed between said master cylinder and said brake and between an oil pressure source for generating a constant oil pressure and said brake, said oil pressure control valve including a valve casing having a first input port communicating with said master cylinder, a second input port communicating with said oil pressure source, an output port communicating with said brake, and an oil pressure chamber communicating with said output port, a spool means slidable fitted in a bore in said valve casing with a pressure receiving face at one end thereof confronted to said oil pressure chamber for alternatively bringing said second input port and said oil pressure chamber into communication on a side contracting said oil pressure chamber and bringing said first input port and said oil pressure chamber into communication on a side expanding said oil pressure chamber, and electrical-driving means operatively connected to the other end of said spool means for providing a thrust corresponding to an energizing power level toward the side contracting said oil pressure chamber.

2. A hydraulic brake system according to claim 1, wherein said electrical-driving means comprises a linear solenoid attached to said valve casing.

3. The hydraulic brake system as defined by claim 1 and further including a second brake connected to said master cylinder, a second oil pressure control valve interposed between said master cylinder and said second brake and between said oil pressure source and said second brake, said second oil pressure control valve including a second spool means slidably fitted in a second bore in said valve casing, a first input port communicating with said master cylinder, a second input port communicating with said oil pressure source, an output port communicating with said second brake and an oil pressure chamber communicating with said output port, and a second electrical-driving means operatively connected to said second spool means for providing a thrust corresponding to an energizing power level to move said second spool means in a direction to contract said oil pressure chamber of said second control valve and bring said second input port and said oil pressure chamber of said second control valve into communication.

4. The hydraulic brake system as defined by claim 1 and further including means for providing different power levels of energization to said electrical-driving means.

5. The hydraulic brake system defined by claim 1 and further including a modulator interposed between said master cylinder and said oil pressure control valve and said modulator includes first and second cylinder bores in said valve casing, said first and second cylinder bores being axially aligned and separated by a partition wall, a first piston slidable in said first cylinder bore and defining an output oil pressure chamber between one side of the first piston and said partition wall and a spring chamber open to atmosphere between the other side of said first piston and said valve casing, a spring in said spring chamber biasing said first piston toward said partition wall, a second piston slidable in said second cylinder bore and defining an input oil pressure chamber between one side of the second piston and said partition wall and a control oil pressure chamber between the other side of said second piston and said valve casing, a fluid passage connecting said master cylinder to said input oil pressure chamber, a flow passage between said input oil pressure chamber and said output oil pressure chamber, a fluid passage connecting said output oil pressure chamber to said oil pressure control valve, a valve mechanism in said flow passage between said input oil pressure chamber and said output oil pressure chamber, said valve mechanism including means biasing said valve mechanism to a closed position and a rod having one end positioned for abutment by said first piston to open said valve mechanism, and a means connecting said first and second pistons together for conjoint reciprocating movement in said first and second cylinder bores.

6. The hydraulic brake system defined by claim 1 and further including a control circuit connected to said electrical-driving means, said control circuit including means responsive to detection of a slip state at said driving wheel for supplying said electrical-driving means with an exciting current to apply brake pressure to said driving wheel.

7. The hydraulic brake system defined by claim 6 wherein said exciting current is supplied in the form of pulses.

8. A hydraulic brake system having a master cylinder, a fluid pressure line connecting said master cylinder to a wheel cylinder on a driving wheel, and an oil pressure control valve interposed between an oil pressure source for generating a constant oil pressure and said wheel cylinder, said oil pressure control valve comprising a valve casing having a input port communicating with said oil pressure source, an output port communicating with said wheel cylinder, and an oil pressure chamber communicating with said output port, a spool means slidable fitted in a bore in said valve casing with a pressure receiving face at one end thereof confronted to said oil pressure chamber for cutting off fluid pressure in said line connecting said master cylinder to said wheel cylinder and bringing said input port and said oil pressure chamber into communication on a side contracting said oil pressure chamber, and electrical-driving means operatively connected to the other end of said spool means for providing a thrust corresponding to an energizing power level toward the side contracting said oil pressure chamber.

9. A hydraulic brake system according to claim 8, wherein said electrical-driving means comprises a linear solenoid attached to said valve casing.

10. A hydraulic brake system according to claim 9, wherein said input port is intercepted in a condition of deenergization of said electrical-driving means.

11. A hydraulic brake system having a master cylinder, and a brake connected to the master cylinder so as to receive an output oil pressure of the master cylinder and afford a braking force comprising an oil pressure control valve interposed between said master cylinder and said brake and between an oil pressure source for generating a constant oil pressure and said brake, said oil pressure control valve including a valve casing having a first input port communicating with said master cylinder, a second input port communicating with said oil pressure source, an output port communicating with said brake, and an oil pressure chamber communicating with said output port, a spool means slidable fitted in a bore in said valve casing with a pressure receiving face at one end thereof confronted to said oil pressure chamber, said spool means being movable in opposite directions in said bore to alternately contract and expand said oil pressure chamber and to bring said second input port and said oil pressure chamber into communication when said spool means is moved to contract said oil pressure chamber and to bring said first input port and said oil pressure chamber into communication when said spool means is moved to expand said oil pressure chamber, and a linear solenoid attached to said valve casing, said linear solenoid having a push-rod extending through said valve casing and coaxially abutting a second end of said spool means and being operative to provide a thrust corresponding to an energizing power level to said push rod for driving said spool means to contract said oil pressure chamber.

12. A hydraulic brake system having a master cylinder, a fluid pressure line leasing from said master cylinder to a wheel cylinder, and an oil pressure control valve interposed between an oil pressure source for generating a constant oil pressure and said wheel cylinder, said oil pressure control valve comprising a valve casing having a input port communicating with said oil pressure source, an output port communicating with said wheel cylinder, and an oil pressure chamber communicating with said output port, a spool means slidable fitted in a bore in said valve casing with a pressure receiving face at one end thereof confronted to said oil pressure chamber, said spool means being movable in opposite directions in said bore to alternatively contract and expand said oil pressure chamber and to cut off fluid pressure in said line leading from said master cylinder to said wheel cylinder and bring said input port and said oil pressure chamber into communication when said spool means is moved to contract said oil pressure chamber, and a linear solenoid attached to said valve casing, said linear solenoid having a push-rod extending through said valve casing and coaxially abutting a second end of said spool means and being operative to provide a thrust corresponding to an energizing power level to said push-rod for driving said spool means to contract said oil pressure chamber.

* * * * *